H. O. JACKSON.
AUTOMATIC COIN CONTROLLED VENDING MACHINE FOR INSURANCE POLICIES, TICKETS, AND THE LIKE.
APPLICATION FILED SEPT. 6, 1907.
952,809.
Patented Mar. 22, 1910.
8 SHEETS—SHEET 7.
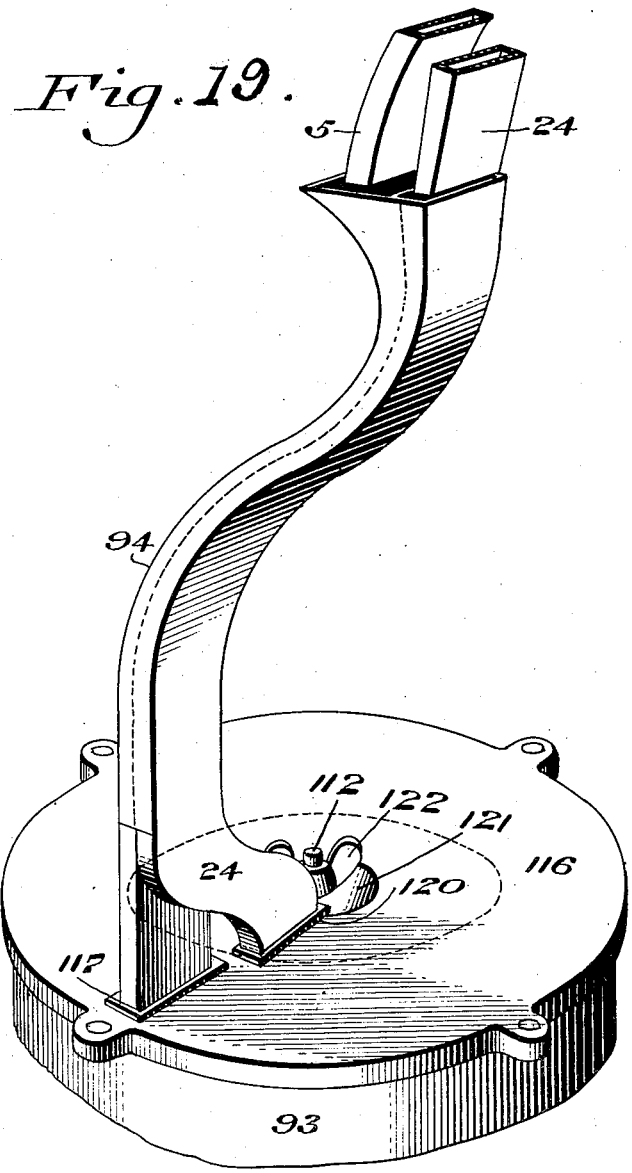

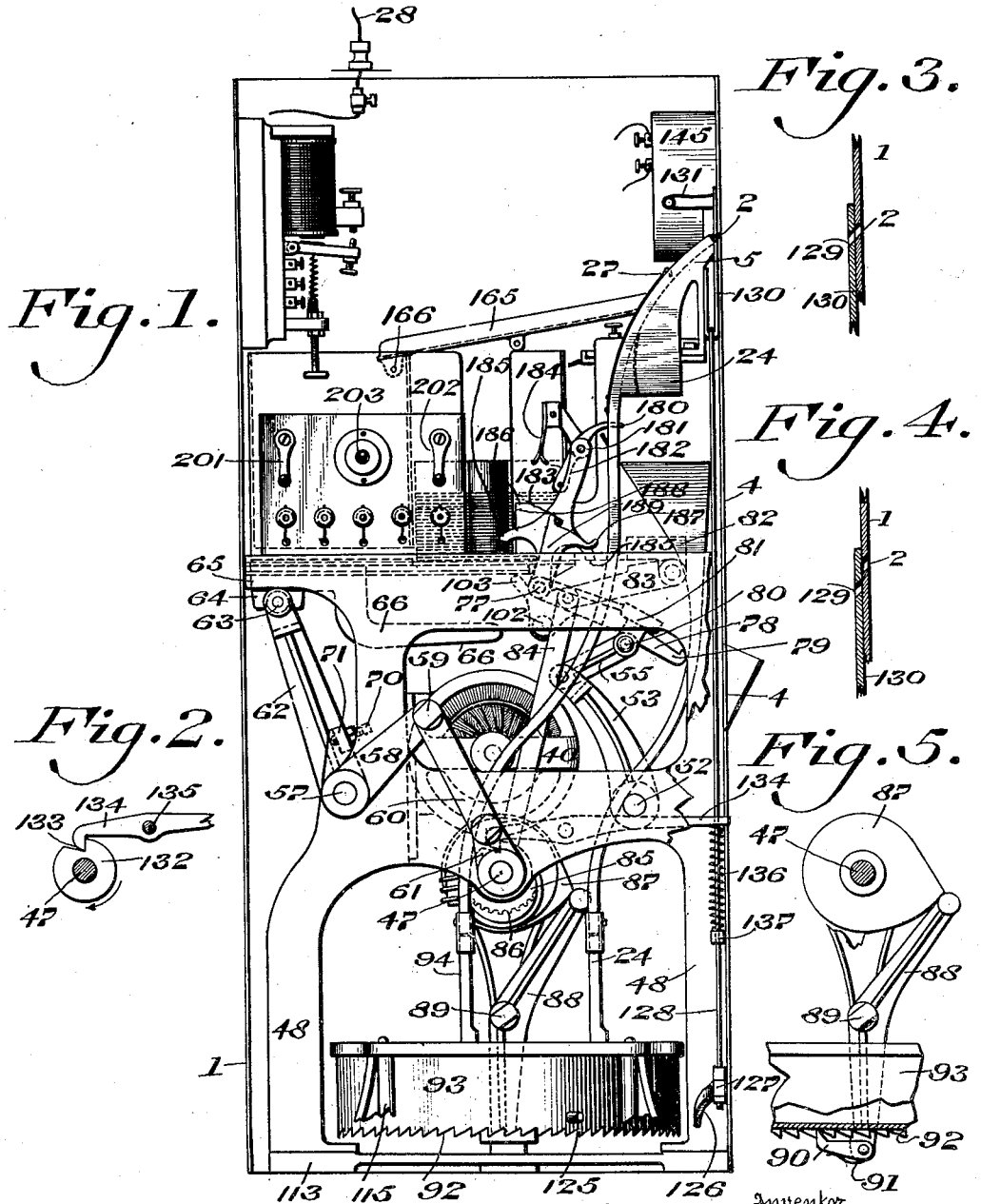

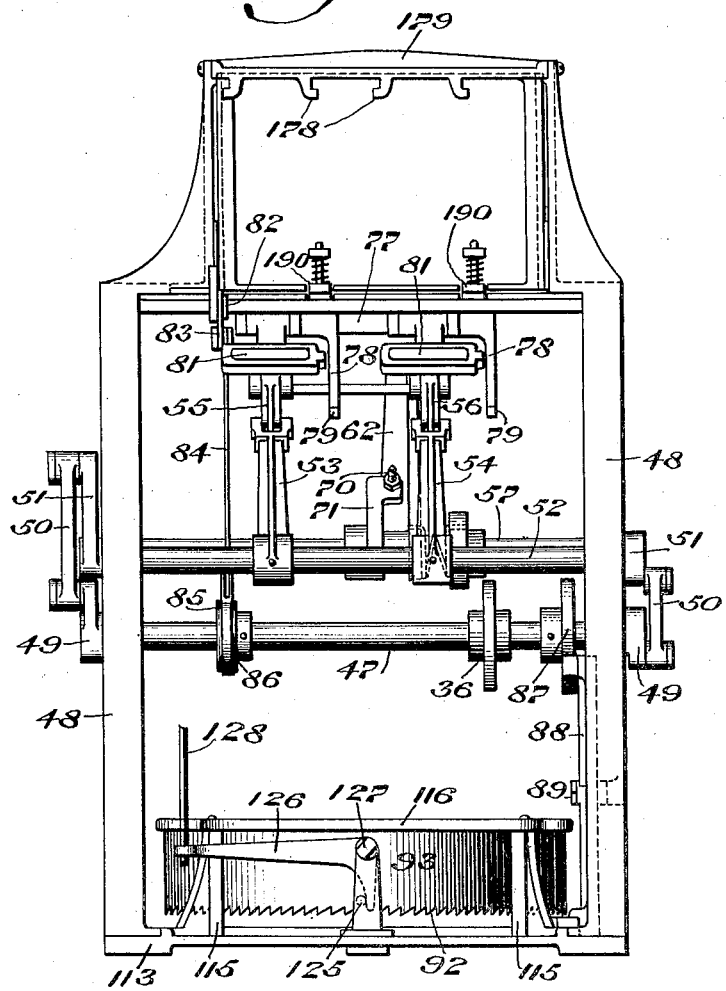

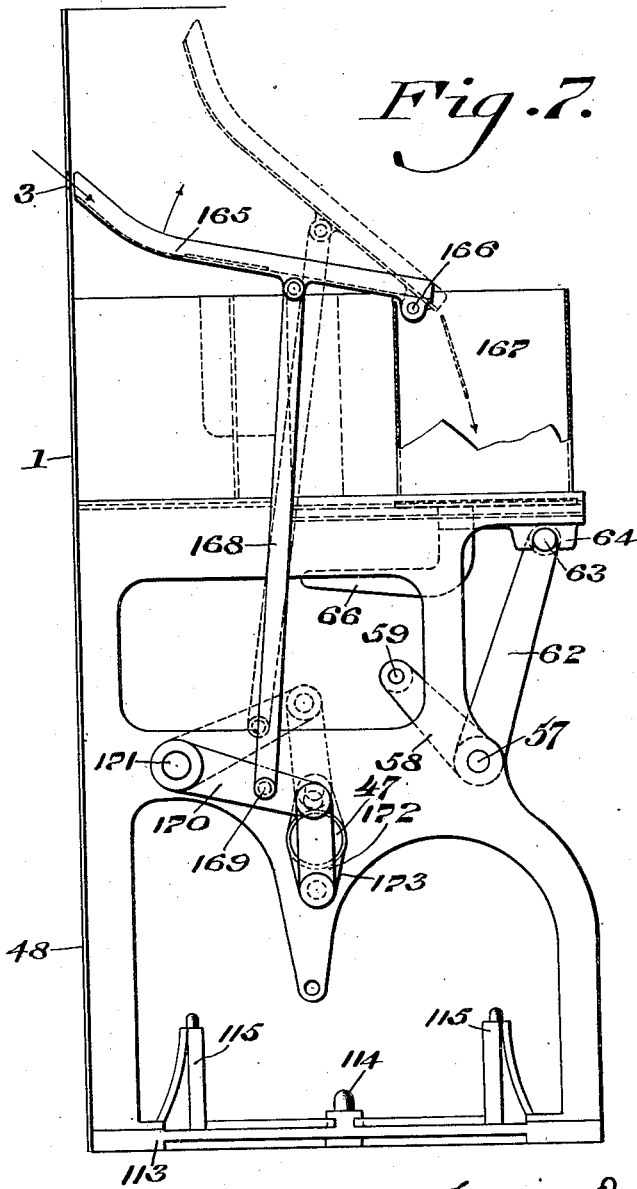

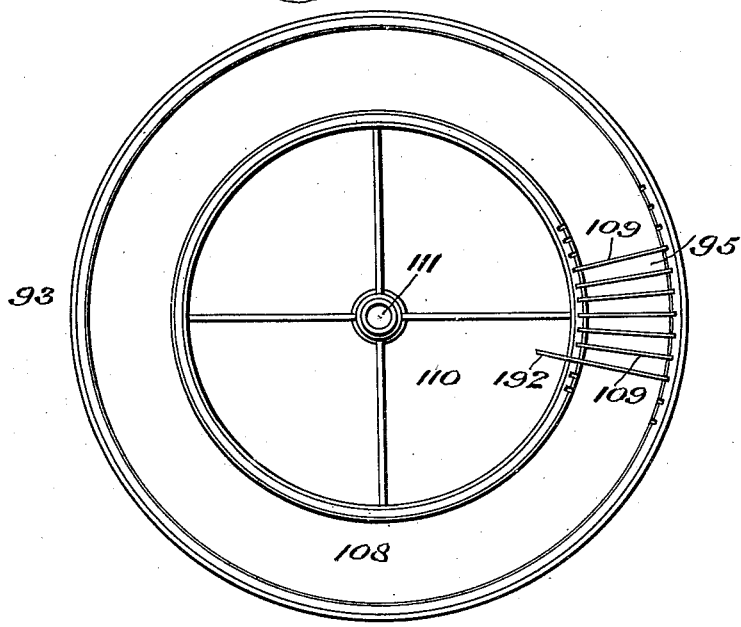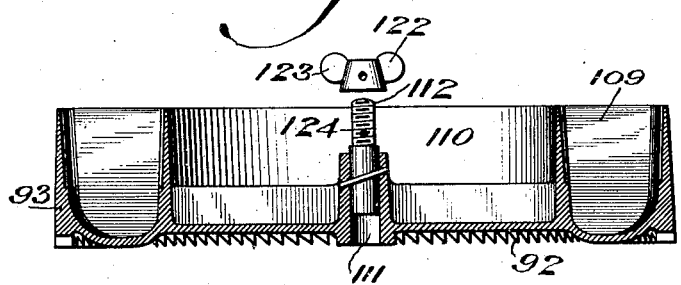

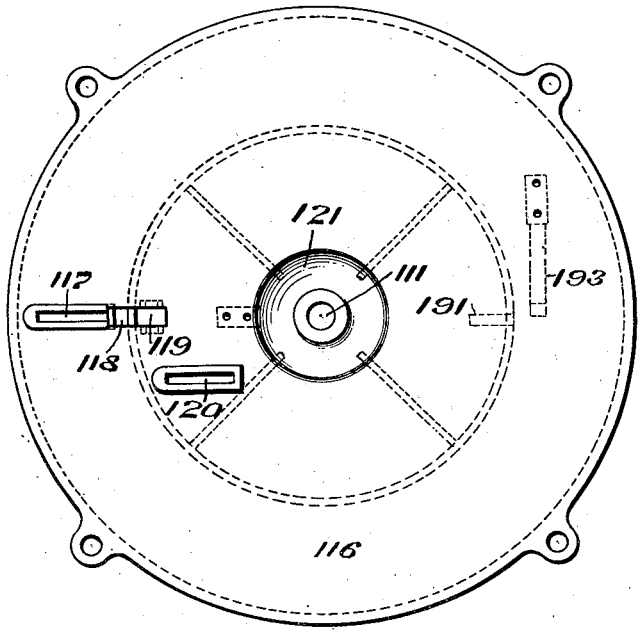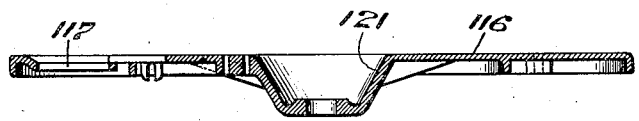

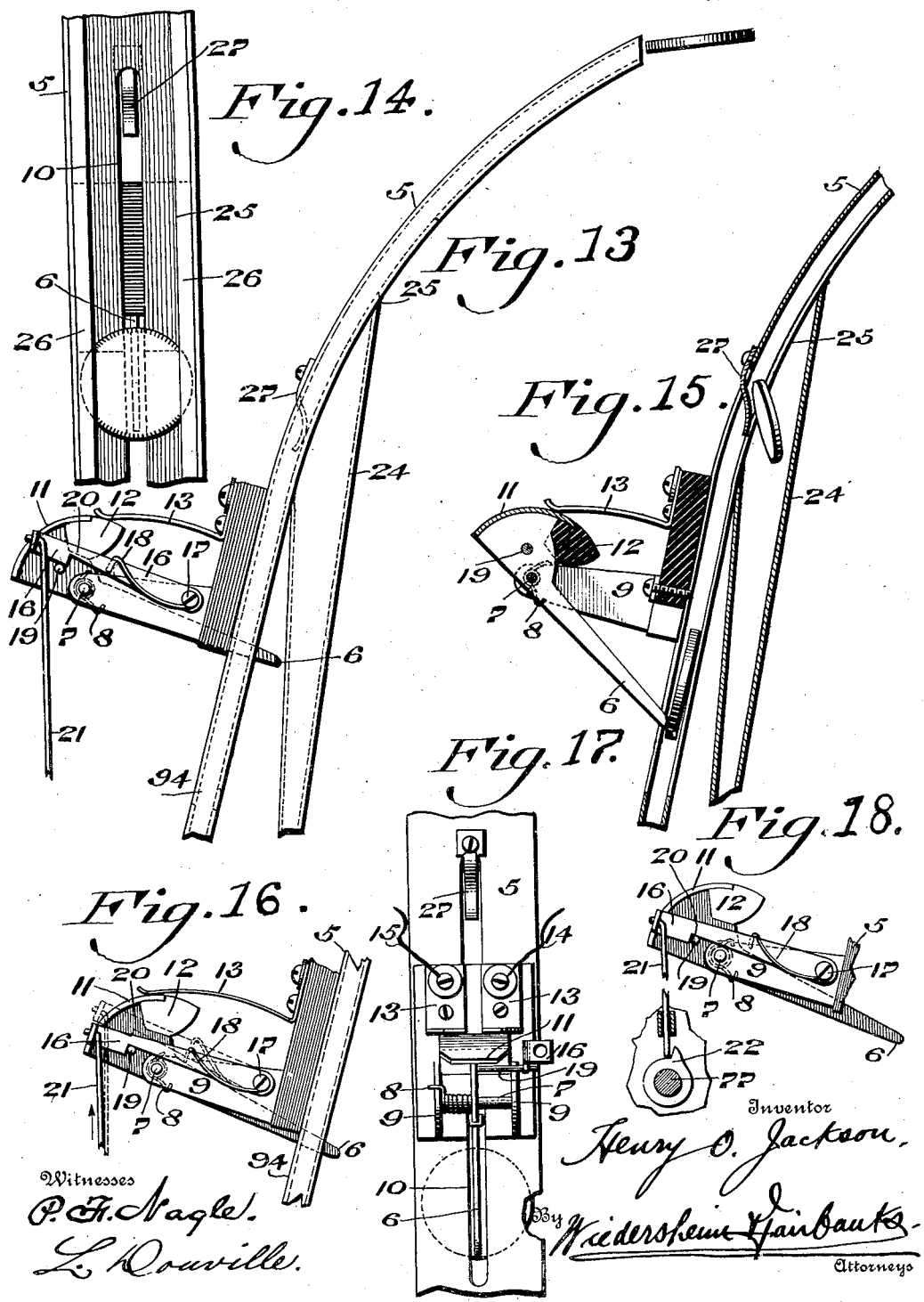

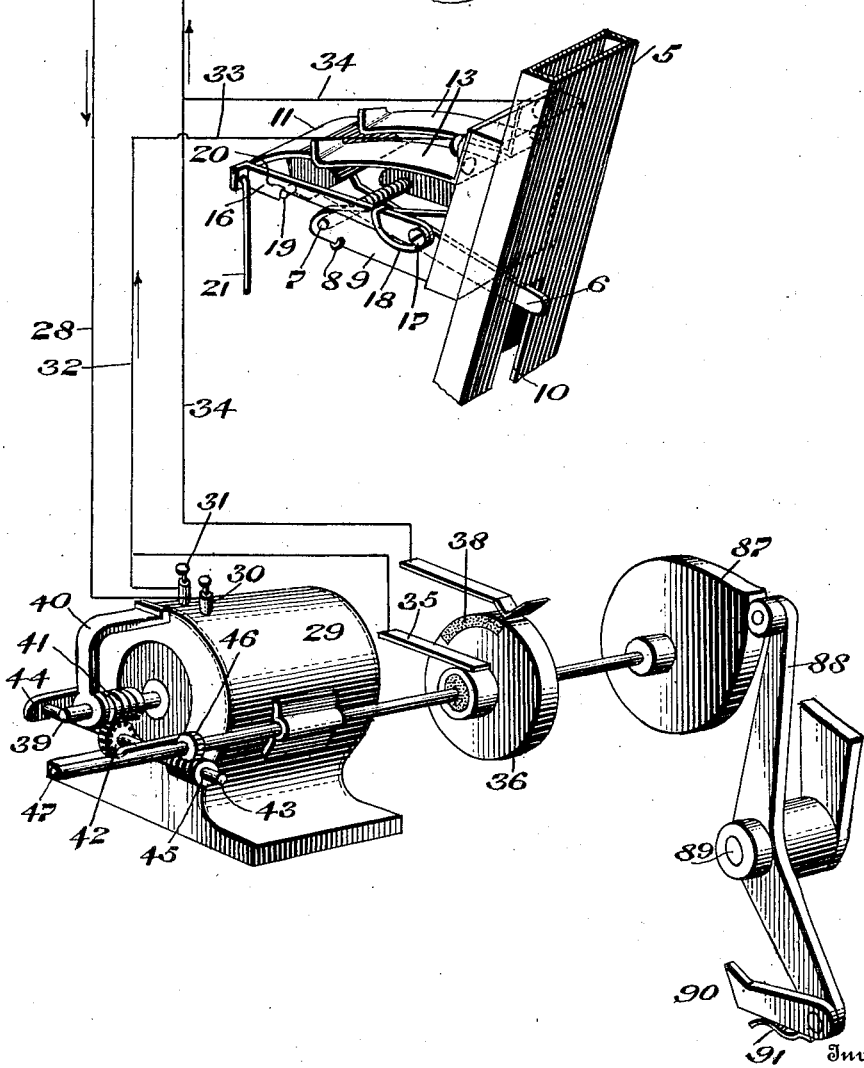

UNITED STATES PATENT OFFICE.

HENRY ORR JACKSON, OF NORFOLK, VIRGINIA, ASSIGNOR TO SOUTHERN SAVINGS LIFE & ACCIDENT INSURANCE COMPANY, A CORPORATION OF VIRGINIA.

AUTOMATIC COIN-CONTROLLED VENDING-MACHINE FOR INSURANCE-POLICIES, TICKETS, AND THE LIKE.

952,809. Specification of Letters Patent. Patented Mar. 22, 1910.

Application filed September 6, 1907. Serial No. 391,545.

*To all whom it may concern:*

Be it known that I, HENRY ORR JACKSON, a citizen of the United States, residing in the city and county of Norfolk, State of Virginia, have invented a new and useful Automatic Coin-Controlled Vending-Machine for Insurance-Policies, Tickets, and the Like, of which the following is a specification.

My present invention relates to a novel construction of a coin controlled vending machine for insurance policies, tickets and similar articles such for example as accident insurance tickets, limited railway and other tickets, and the like.

One of the main objects of my invention is to design a machine in which a three coupon ticket is employed and which comprises in its broad scope, a motor, a novel circuit opening and closing mechanism for said motor operated by the insertion of a coin for operating said motor at the desired periods or for the desired intervals, duplicate time stamps operated by a suitable clock mechanism, a novel construction of coin controlled means for feeding a ticket to position to be printed or impressed, including also a coupon severing means, a chambered rotary coin and coupon receiver actuated at each operation of the machine to bring an empty chamber into position for receiving the next coin and severed coupon, and a ticket delivery chute.

In my present invention, I have dispensed with many of the parts which have heretofore been deemed indispensable in machines of this character and have designed a simplified and compact construction which may be manufactured with great economy and which gives in practice satisfactory and reliable results.

To the above ends, my invention consists broadly of a motor adapted to be actuated for the requisite period by the insertion of a coin, said motor being operatively connected with a novel construction of rotatable coin receiver whereby the latter is suitably actuated during the cycle of operation of the motor.

It further consists in the novel construction of an annular rotary receiver with a coin chute and coin slot, and means intermediate said annular receiver and said coin slot for indicating when the receiver is filled or has reached its maximum capacity.

It further consists of a novel construction of coin release, and novel means for opening and closing the motor circuit by coin operated mechanism, means being also provided for shunting the circuit, so as to continue the action of the motor upon the release of the coin and opening of the main circuit.

It further consists of a novel construction of a double coin chute by the employment of which coins of improper dimension pass to a separate chamber for such coins in the coin receiver.

It further consists of a novel construction of contact opening and closing mechanism controlled by a coin.

It further consists of a novel construction of rotary receiver and a novel construction of stationary cover therefor.

It further consists of other novel features of construction, all as will be hereinafter fully set forth and pointed out in the claims.

Figure 1 represents a side elevation of a coin controlled vending machine for insurance policies, tickets and the like embodying my invention, the side casing and certain parts having been removed for clearness of illustration. Fig. 2 represents a sectional view of Fig. 1 showing a cam shaft, cam and its co-acting lever. Figs. 3 and 4 represent sectional views showing the coin slot in open and closed position. Fig. 5 represents a sectional view of Fig. 1, showing more clearly the manner in which the coin receiver is actuated. Fig. 6 represents a front elevation of the machine, certain parts having been removed for the sake of clearness of illustration. Fig. 7 represents a plan view of the coin receiver. Fig. 8 represents a sectional view of Fig. 7 and certain of its adjuncts. Fig. 9 represents a side elevation of one of the compartment forming members seen in Figs. 7 and 8. Fig. 10 represents a plan view of the cover for the coin receiver. Fig. 11 represents a sectional view of Fig. 10. Fig. 12 represents a side elevation of the upper portion of the coin chute and my preferred form of contact mechanism. Fig. 13 represents a rear elevation of a portion of Fig. 12. Fig. 14 represents a sectional view of Fig. 12, but showing the parts in a different relation and also a coin of improper dimension passing through the chute. Fig. 15 represents a side elevation of the contact mechanism and its adjuncts. Fig. 16 represents a front elevation of a portion of Fig. 13. Fig. 17 represents a sectional elevation showing the contact mechanism and certain of its adjuncts. Fig. 18 represents a perspective view of my preferred coin chute, coin receiver and cover. Fig. 19 represents a diagrammatical perspective view of a portion of the coin chute, the main and secondary circuit closing devices, the motor switch, and their adjuncts.

Similar numerals of reference indicate corresponding parts in the figures.

Referring to the drawings: In the detailed description of our novel construction of coin actuated mechanism for vending insurance policies, tickets and the like, it will be understood that I have shown but one embodiment of the broad principle of my invention, since it is apparent that the same may be carried out in various forms of mechanisms or organizations, without departing from the spirit and scope of the same and can be put to various uses other than those hereinafter described.

The present invention in its broad aspects comprises several distinct sets of mechanisms, which coöperate and are dependent upon each other to produce the ultimate objects or results sought for, and I will therefore describe each of the same in detail and in the natural or logical sequence in which they are thrown into operation by the insertion of a proper coin or token into the apparatus.

In its broad aspects, my novel machine embodies first a suitable outer or inclosing casing, upon or within which is mounted or carried respectively, the coin chute for the reception of the proper coin or token, second, the main and secondary circuit opening and closing apparatus actuated at the proper periods by the insertion of the proper coin or token, third, the manner of operating the motor at the required periods which is thrown into operation by the closing of the circuit by the coin, fourth, the actuation or rotation of the rotary coin and coupon receiver to the desired extent and sixth, the novel means for indicating that the coin and coupon is filled.

I will now describe in detail the operation of the various co-acting mechanisms which are thrown into operation by the insertion of the proper coin or token.

1 designates the casing which may be of any desired size or contour. The front wall of the casing is provided with a coin slot 2, a receipt slot 3 and a delivery slot 4. The proper check or coin having been inserted in the slot 2, it falls into the coin chute 5 and if of the proper dimensions descends by gravity until it reaches the contact lever or arm 6, (see Figs. 12 to 17 inclusive) which is fulcrumed at 7 and extends into or through the coin chute. The weight of the coin depresses the lever 6 against the tension of the spring 8, it being noted that the lever 6 is fulcrumed on an arm 9 carried by a stationary support such as the coin chute and that the latter is slotted as at 10.

11 designates a contact, preferably curved, carried by the lever 6, and 12 designates insulation or an insulated block in proximity thereto and also carried by said lever.

13 designates contact arms connected with the wires 14 and 15 and carried by the chute 5, in the present instance.

16 designates a lever fulcrumed at 17 and provided with a spring 18 whereby it is maintained in engagement with the pin 19 carried by the lever 6, it being noted that at certain times the pin 19 engages the notch or catch 20 in said lever 16. The end of the lever 16 is deflected at its end and apertured in the present case so that one end of the rod 21 may be readily secured thereto, the other end thereof riding on the cam 22 mounted on a shaft 77.

The coin chute 5 is made double for a portion of its length so that coins of improper dimensions will be separated from the coins of the proper denomination and dimensions.

24 designates a branch of the chute 5 which is apertured at 25 so as to form flanges or guides 26 as seen in Fig. 13. If the diameter of the coin is smaller than a coin of proper size, it will be apparent that as it descends, it will upon its engagement with the spring 27 be guided into the chute 24 since it will not be held by the flanges 26 of the coin chute 5. As the coin of proper denomination depresses the lever 6, see Fig. 14, the latter will turn on its fulcrum 7 and cause the contact 11 to engage the contact 13 which will close the main circuit, it being understood that the current enters the apparatus at 28 as seen in Fig. 19 and passes into the motor 29 through the binding post 30 and leaves the motor through the binding post 31 and passes through connections 32 and 33 to the contact spring or devices 11 and thence out by the connection 34. The main circuit being now closed, when the lever 6 has been actuated by a coin, it will now be seen that when the motor starts the current will then flow through the connection 33 and brush 35 to the rotary switch 36 and back through the brush 37 to the connection 34 and thence to the apparatus. It will be understood that the rotary switch 36 when in normal position will have its insulated segment 38 directly beneath or in contact with the brush 37, in which position the circuit is broken between brushes 35 and 37, said switch being directly connected with the motor. As soon as the motor and switch begin to turn from their initial or normal position, as best seen in Fig. 19, the insulated segment 38 passes out of contact with the brush 37, whereupon the secondary circuit is closed between the brushes 35 and 37, as above explained. The motor 29 being now in operation, it will be seen that as its shaft 39 rotates in its bearings or bracket 40, power will be transmitted by the worm 41 to the gear 42 mounted on the shaft 43, which has suitable bearings 44, said shaft 43 carrying a worm 45 which meshes with a gear 46 mounted on the shaft 47 which has suitable bearings in the side frame members 48, as seen in Fig. 6, and carries the rotary switch 36 and its adjuncts, heretofore described.

49 designates cranks mounted on each end of the main shaft 47 as seen in Fig. 6, each having one end of the link 50 connected thereto, the other ends of said links being connected to the ends of the arms 51 which are fast on the shaft 52, which has its bearings in the side frame 48. The shaft 52 has the arms 53 and 54 fast thereon. These arms 53 and 54 are connected to the upper arms 55 and 56, thereby forming toggles.

57 designates a shaft journaled in the frame members 48 and having fixed thereto, one end of a lever 58, the other end of which is pivoted at 59 to one end of a lever 60, which latter is pivoted to a link 61 carried by the shaft 47.

62 designates a lever fixed on the shaft 57 and carrying at its outer end a roller 63 which bears against the lugs 64, depending from the ticket feeding plate or member 65. The member 65 is provided with the forwardly extending fingers 66, the ends of which are preferably beveled and also with ribs or flanges 67. The stroke of the lever 62 may be adjusted by means of the set screw 70 provided, if desired, with a lock nut and carried by the bracket 71 and adapted to engage a rib or projection on the lever 62.

76 designate lugs carried by the plate 72, thereby adapting the same to be pivotally mounted on a shaft 77, on which latter are loosely mounted the ticket supporting arms 78, each having at its forward end an abutment 79.

80 designates a rod pivoted to the levers 55 and by which the platens or tympans 81 are carried.

82 designates a stationary blade having pivoted thereto the shear or blade 83, the outer end of which is pivoted to a lever 84 which is connected by straps 85 to an eccentric 86 mounted on the shaft 47.

87 designates a cam mounted on the shaft 47, one half of said cam in the present instance being concentric and the other half of said cam eccentric with its center, the working faces of said cam serving to actuate the lever 88 fulcrumed at 89 to the frame.

90 designates a pawl carried by the lever 88 and provided with a spring 91 whereby it is held in engagement with the ratchet teeth 92 of the coin receiver or magazine 93.

It will now be understood that during the above described movements of the various parts, the coin or check is still supported on the lever 6 and that the closing of the circuit between the points 11 and 13 has started the motor, the effect of which has been to move the arm 21 owing to the provision of cam 22 thereby withdrawing the arm 6 from the aperture 10 and permitting the coin to drop through the coin and coupon chute 94 into one of the chambers 95 seen in Fig. 7, of the rotary receiver 93. The closing of the above mentioned circuit has also the effect of raising the platens and moves the ticket feeding member 65 forwardly, thereby bringing a ticket 96 into proper position to be printed. The ticket preferably comprises a blank, consisting of three coupons, one of the coupons being preferably the size of the coin and means being provided for severing such coupons and permitting the same to pass to the proper chamber of the receiver 93. As the member 65 moves forwardly the fingers 66, the forward end of which are beveled engage the rod 102 and cause the fingers 78 to be brought to a horizontal position, since their outer end 103 abuts against the ticket supporting plate 72, it being understood that the arms 78 serve as a support after a ticket has been moved to its forward position, and after the member 65 moves rearwardly the members 78 assume the position seen in Fig. 1. Just as the ticket reaches its forward position, the parts are so timed that the platen is raised and the coupon 99 cut off by the severing mechanism. When the platen is raised by means of suitable mechanism, duplicate dates will be impressed on the ticket on the further rotation of the motor shaft and the main shaft the platens will return to their normal position and the ticket will remain temporarily on the arms 78 owing to the abutment 79, after which the ticket passes through the delivery opening 4 into a position accessible to the purchaser. On the further downward movement of the members 78, the parts 97 and 98 of the ticket pass through the delivery opening 4 into a position accessible to the purchaser who can then sever the ticket on the line 101 and inscribe the part 98 as above explained. As the platen 81 and its adjuncts begin to descend to their normal position, the cam 87 is rotated in such a direction that the pawl 90 carried by the lever 88 engages one of the teeth 92 and causes the receiver 93 to rotate a space equal to one chamber 95. The receiver 93 has an annular chamber 108 near its periphery, the inner walls of which are provided with grooves whereby when the plates 109 are inserted in position, the compartments 95 are formed, it being noted that the latter are substantially U-shaped in the present instance and have their lower portion cut away to form shoulders. The receiver 93 is also provided with an inner chamber 110. The coin receiver is provided with a central aperture 111 in which is fixed in any suitable manner, a threaded rod 112. The base plate 113 seen most clearly in Fig. 1, has a pin or lug 114 which when the parts are assembled, engages the aperture 111 and the bottom of the rod 112.

115 designates rods carried by the base plate 113 and these rods have secured at their upper ends, the stationary cover 116. The cover 116 is provided with an aperture 117 with which the chute 94 communicates and which is in line with a compartment 95. In order to prevent improper rotation of the receiver 93 and its adjuncts with respect to the cover 116 during shipment, I pivot to the latter a plate or bar 118 which is provided with a lug or projection 119 which is adapted to engage the slot or aperture 117 and project into one of the chambers 95 whereby the receiver 93 is temporarily held in fixed position with respect to said cover during transmission from the office or factory to the desired point.

120 designates an aperture or slot in the cover 116 communicating with the inner chamber 110, said slot registering with the discharge end of the chute 24 for coins of improper dimensions. The central portion of the cover through which the rod or screw 112 passes is depressed or deflected inwardly as seen at 121, and the cover is secured with respect to the base plate 113 by a thumb or other nut 122 apertured as indicated at 123, whereby a wire may be passed therethrough and through an aperture 124 in the rod 112 and sealed in order to prevent any tampering with the receiver 93 or its contents by any person not properly authorized.

Referring now to Figs. 1 to 6, it will be seen that when the receiver 93 has made one complete revolution, the pin 125 carried thereby will engage the bell crank lever 126 fulcrumed at 127 thereby rocking said lever and exerting a pull on the rod 128 and causing the apertures 129 in the plate 130 to which it is attached to move out of register with the coin slot 2, thereby indicating that the capacity of the receiver 93 has been reached. A spring 131 is provided whereby the slots 129 and 2 are normally maintained in register with each other. In order that the slots 129 and 2 will be out of register while the machine is operating, I mount on the shaft 47, a cam or block 132 having a notch or recess 133 in its periphery with which engages the deflected end of a lever 134 fulcrumed at 135 and having its outer end, in the present instance, mounted on the rod 128 and engaging a spring 136 interposed between said lever and a set collar 137 carried by said rod 128, the effect of which is evident.

The foregoing description of my novel invention has particular reference to the mechanisms whereby upon the insertion of a coin, the main and secondary circuits are opened and closed, the motor, main shaft and their adjuncts caused to be actuated and the receiver 93 rotated to its full capacity and simultaneously therewith, the coupon severed and caused to fall into the receiver along with the coin which has set the apparatus in operation.

In Fig. 1, I have shown a modified form of contact mechanism in which 180 designates the lever with which the coin coacts, said lever being fulcrumed at 181 to a lever 182 and having a contact 183 adapted to coact with a stationary contact 184. The lever 182 is loosely mounted on the shaft 77 and its movement is limited by the lugs or extensions 185 which abut against the frame of the machine.

186 designates a pin carried by the lever 182 which lies in the path of the lugs 187 and 188 carried by a lever 189 fixedly mounted on the shaft 77. It will be apparent that when the shaft 77 is rocked rearwardly or to the left of the position seen in Fig. 1, the lever 182 will remain stationary thus holding the lever 180 in the position indicated until the lug 187 strikes the pin 186, whereupon the lever 182 will be rocked thereby causing the contact 183 to engage the contact 184 and the lever 180 will be moved into such a position that the coin can pass through the coin slot 5 into the continuation thereof 94 and thence to a compartment 95 in the coin receiver.

In order that a ticket will be moved in an accurate manner, I employ a tension device which consists in the present instance of spring pressed plungers 190, the construction of which will be apparent from Fig. 6.

In order to form a positive stop for the coin receiver, I preferably provide the cover with a depending lug 191, which abuts against an extension 192 of one of the members 109 when the coin receiver is full as will be readily apparent from Figs. 7 and 10. I also preferably secure to the under side of the cover, a spring pressed pawl 193 which coacts with the members 109 to prevent any improper rotation of the coin receiver 93.

The operation of my novel device will now be apparent to those skilled in the art. The insertion of the coin in the coin slot 2 closes the motor circuit, whereupon by the rotation of the motor, the platens and their adjuncts are raised, the ticket is moved to position, the arm 6 is moved rearwardly, the coupon of the ticket is severed at the proper interval and falls through the coin and coupon chute 94 into the chamber 95 of the rotary coin and coupon receiver 93. Just prior to the severing of the coupon, the corresponding dates are printed thereon, after which the ticket which now comprises only two parts is discharged at the slot 4 into a position accessible to the purchaser. At this time the rotary receiver 93 is given an intermittent rotation equal to the extent of one ratchet tooth 72 or one chamber 95. At the proper interval, the arm 6 moves away from the coin chute 5 so that the coin can drop from the arm 6 into the coin and coupon chute 94, as explained.

The operation of the clock mechanism being continuous, it will be seen that at whatever instant the coin is inserted in the machine, the proper date will directly thereafter be automatically pressed upon the desired portions of the ticket under all conditions automatically and without requiring attention of the operator.

By reason of the employment of the rotary switch 36, its brushes 35 and 37, and their adjuncts, it will be apparent that the circuit is shunted through the main body of the rotary switch, when the coin is released from its position on the lever 6, thereby continuing the rotation of the motor 29 and the main shaft 47 for one complete cycle or revolution.

The receipt coupon passes on to a slide 165 pivoted at 166 and adapted to discharge said coupon into the receiver 167. The slide 165 has pivoted thereto, the lever 168, the lower end of which is pivoted at 169 to a lever 170, the latter having one end pivoted at 171 to the frame of the machine, the other end thereof being pivoted to a link 172 pivoted to a crank arm 173 mounted on the shaft 47.

During the operation of the machine, as has been explained, the date, hour and minute of the purchase are simultaneously stamped upon the coupons, and the ticket magazine is initially charged with tickets superimposed upon each other, as indicated in Fig. 1.

It will be understood that after the coupon is discharged through the slot 4, the purchaser in accordance with instructions printed on the ticket, signs a portion of the coupon, placing his name and address thereon, detaches it from the other portion of the coupon, and deposits it in the receipt slot 3 of the machine whence it falls into the box of the machine. When the coin and coupon receiver is filled it is removed fom the machine and taken to an office of the company where the seal is broken and the thumb nut or equivalent closing device 122 is removed so that the cover 116 can be lifted from the receiver 93, after which the coins and coupons from each chamber of the receiver can be examined and filed away together. If a bogus coin is found a record can be readily kept thereof, so that the company is able to avoid payment of insurance in case of fraud.

It will be apparent that the rotary receiver 93 is locked and sealed at the office of the company or lessee of the machine prior to being despatched to its point of use It will further be apparent that after each of the rotary receivers 93 is filled to the maximum capacity and such condition has been indicated as explained by the automatic closing of the coin slot 2, said receiver can then be removed by a proper officer of the company or lessee of the machine or by some person properly authorized and transmitted to the proper office or department of the company for inspection and examination, and then replaced by an empty sealed receiver, so that there is at no time, any opportunity for the receiver or its contents to be inspected or tampered with excepting by some person properly authorized.

It will be apparent to those skilled in the art that changes in the arrangement and combination of the various mechanical elements may be made and some of the parts may be omitted without departing from the spirit of my invention, one fundamental principle of my novel device being that of a time stamp, a motor, and a coin controlled means for opening and closing the motor circuit for controlling the delivery of a time stamped ticket to the purchaser. It will be further apparent that in lieu of the external electric connections shown for example in Fig. 19, I may employ any suitable source of electric energy both for the time stamp and for the motor and that the manner of arranging and combining the electric connections which form the shunt circuit from the rotary switch 26 to the coin operating circuit, opening and closing device, may also be varied by those skilled in the art, without departing from the spirit and scope of my invention.

I am familiar with the construction of the prior patent to Flora, No. 748,272, granted December 29, 1903, wherein is disclosed a ticket stamping and vending machine, certain of whose mechanisms are thrown into operation by the manipulation of a crank or handle after the insertion of a coin. This construction has been found in practice to give excellent results, but for certain purposes, I have found that it is in some instances preferable to employ an electric motor of the general character here described and to provide a main and secondary circuit therefor, said main circuit being opened and closed by the insertion of a coin in the apparatus, whereby the entire machine is self-contained and all its operative parts are securely concealed and confined within a suitable casing. I have further found in practice that it is under some conditions, advantageous to employ a circular annular receiver in place of the rectangular receiver shown in the patent aforesaid, since the capacity of the machine is somewhat increased thereby. I have also found in practice that it is possible to dispense with certain of the mechanical elements shown in the Flora patent aforesaid, whereby the expense of manufacture of machines of this character in large quantities for the market can be greatly lessened and to none of the features described and claimed in the patent aforesaid do I herein make claim.

It will be apparent that for the sake of clearness of illustration, elements which appear in other drawings have been purposely omitted from certain of the drawings, and I have also for convenience of illustration shown diagrammatically various mechanisms, the function of which, however, will be apparent to those skilled in the art.

It will be obvious that many changes in the details of construction within the scope of my invention may be made and that the description of the machine has been given in detail merely for clearness of understanding and that no undue limitation should be understood therefrom.

Having thus described my invention, what I claim as new and desire to secure by Letters Patent, is:—

1. In a vending machine, a coin chute, means for guiding coins of improper dimension therefrom, a branch chute into which said latter pass, a rotatable receiver having independent compartments into which coins of proper dimension pass and having a separate compartment for coins of improper dimension, and means controlled by a coin for actuating said receiver.

2. In a vending machine, a coin chute, a branch therefrom into which coins of improper dimension are guided, a movable member with which a coin in said chute engages, a contact carried thereby, a coacting stationary contact, an electric motor controlled by said contacts, and a coin receiver intermittently actuated by said motor and having a central chamber for coins of improper dimension, and a plurality of independent chambers for coins of proper dimension.

3. In a vending machine, a coin chute having its under side closed and provided with an open side and provided with guides with which a coin of predetermined dimensions engages and having a narrow longitudinal slot in said closed side, contact mechanism having a movable member extending into said slot in the path of a coin, and yielding means for causing a coin of improper dimensions to pass through said open side.

4. In a vending machine, a rotatable coin receiver having a central chamber, compartment forming members within said annular chamber, one of which is extended, a stationary cover, a stop carried thereby adapted to engage said extended member, and a coin chute adapted to guide a coin of proper dimensions to one of said compartments.

5. In a vending machine, a rotatable coin receiver having a plurality of compartments, a rod carried thereby, a stationary cover for said receiver having a centrally depressed portion through which said rod extends, means engaging said rod and located in said depressed portion for sealing said cover with respect to said receiver, and coin controlled means for intermittently rotating said receiver.

6. In a vending machine, a rotatable coin receiver having a plurality of compartments, a rod carried thereby, a stationary cover for said receiver having a centrally depressed portion through which said rod extends, means engaging said rod and located in said depressed portion for sealing said cover with respect to said receiver, coin controlled means for intermittently rotating said receiver, a coin slot, and means actuated by said receiver for automatically closing said slot.

7. In a vending machine, a main coin chute, a branch chute therefrom for receiving coins of improper dimensions, a rotatable receiver having annularly disposed compartments adapted to register with the main chute and a central compartment for said branch chute.

8. In a vending machine, a coin chute, a branch chute for coins of improper dimensions, and a rotatable receiver having a series of independent compartments adapted to successively register with said main chute and a separate compartment for said branch chute.

9. In a vending machine, an electric motor adapted to be intermittently actuated, a coin operated circuit controller in a main circuit, a motor operated circuit controller in a branch circuit, and motor operated means for intermittently rotating a coin receptacle.

10. In a vending machine, an electric motor adapted to operate the same, a coin operated circuit controller in a main circuit adapted to close the motor circuit, and a motor operated circuit controller in a branch circuit adapted to open the motor circuit.

11. In a vending machine, an intermittently actuated electric motor, a main shaft therefor, a coin controlled main circuit adapted to close the motor circuit, a rotary switch on the main shaft in a branch circuit adapted to open said motor circuit, a cam on said main shaft, and a coin receptacle intermittently rotated thereby.

12. In a vending machine, a pivoted member normally in the path of a coin and having a contact, a tension device for said member, a stationary contact, a stop pin on said member, a pivoted stop adjacent said member, a tension device for said stop, and motor actuated means for moving said pivoted stop.

13. In a vending machine, a pivoted member normally in the path of a coin, and having a contact, a coacting stationary contact, a tension device for said member, a stop pin on said member, a pivoted stop adjacent to said member, and a tension device for said stop.

14. In a vending machine, the combination with a coin chute, of a branch chute, leading therefrom, yielding means for deflecting a coin of improper dimension into said branch chute, a stationary contact carried by said main chute, a pivoted lever extending through said main chute with which a coin of proper dimensions co-acts, a contact carried by said pivoted member, an insulated block carried by said member against which said stationary contact normally bears, a tension device for said lever, and an electric motor controlled by said contacts.

15. In a vending machine, the combination with coin controlled contact mechanism, of a rotatable receiver for the coins, an electric motor in circuit with said contact mechanism adapted to actuate said receiver, and means for preventing insertion of a coin in the machine during the rotation of said receiver.

16. In a vending machine, a coin chute having an opening in its under side and provided with guides with which a coin of predetermined dimensions engages, yielding means located in proximity to said open side for causing a coin of a smaller diameter than the diameter of the predetermined coin to pass through such open side, a branch chute communicating with said coin chute and contact mechanism actuated by a coin of proper dimensions passing through said branch chute.

HENRY ORR JACKSON.

Witnesses:
C. D. McVay,
H. S. Fairbanks.